Figure 4:
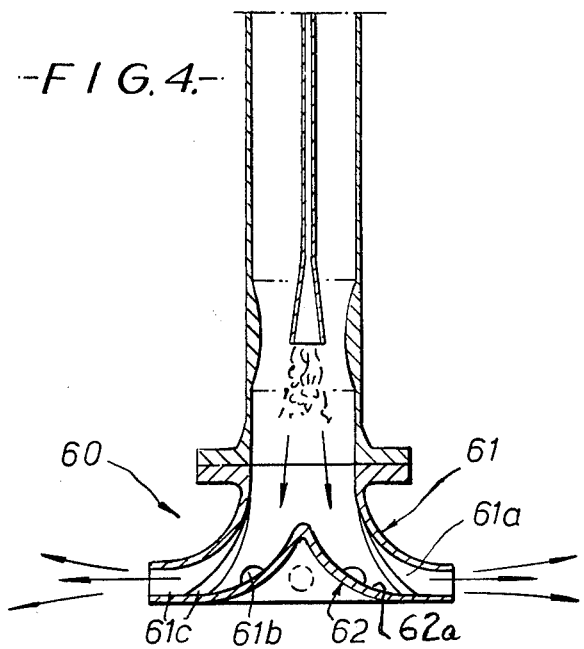

United States Patent [19]

Tveit

[11] 4,044,079

[45] Aug. 23, 1977

[54] DROP LINE DEVICES

[75] Inventor: Oyvind Tveit, Skjoldtun, Norway

[73] Assignee: Patents and Developments A/S, Helldal, Norway

[21] Appl. No.: 633,782

[22] Filed: Nov. 20, 1975

[30] Foreign Application Priority Data

Nov. 20, 1974 Norway .................................. 744164

[51] Int. Cl.² ............................................. B01F 3/04
[52] U.S. Cl. .................................. 261/36 R; 259/95;
261/DIG. 75; 261/124
[58] Field of Search ...................... 259/4 R, 18, 95, 96;
239/488; 261/77, 121 R, 124, DIG. 75, 29, 36 R

[56] References Cited

U.S. PATENT DOCUMENTS

| 1,992,261 | 2/1935 | Traudt | 259/95 X |
| 2,077,907 | 4/1937 | Streander | 261/77 |
| 2,883,169 | 4/1959 | Daman | 261/77 |
| 3,948,492 | 4/1976 | Hege | 259/8 X |

FOREIGN PATENT DOCUMENTS 1,940,458   5/1970   Germany ................................ 259/95

Primary Examiner—Robert W. Jenkins
Attorney, Agent, or Firm—Kenyon & Kenyon, Reilly, Carr & Chapin

[57] ABSTRACT

Drop line devices for the supply of fluid cargo to the bottom of a tank, especially in combination with cargo circulation units comprising pump means for driving the cargo from and back to the tank. The devices comprise a conduit for arrangement substantially vertically in the tank. The upper end of the conduit is for connection to a pressure source of the cargo. The lower end is connected to a discharge head formed with stationary guide surfaces adapted to direct the outflow of cargo over a predetermined angle in a plane along the bottom of the tank.

6 Claims, 5 Drawing Figures

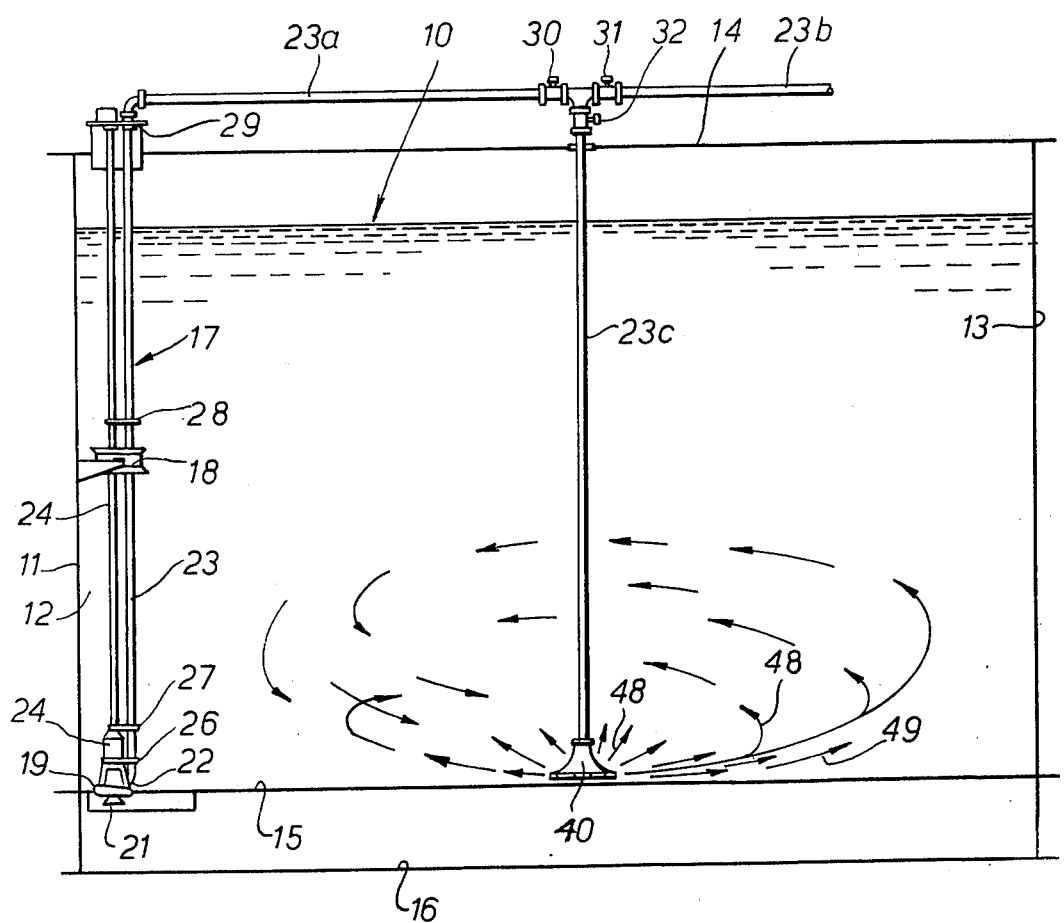

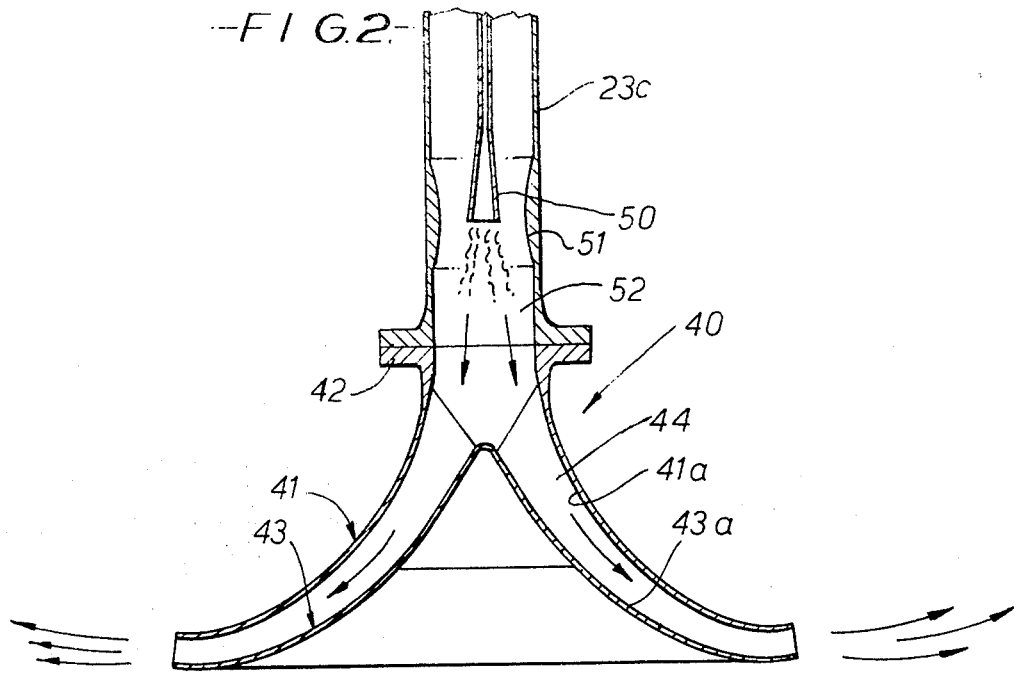
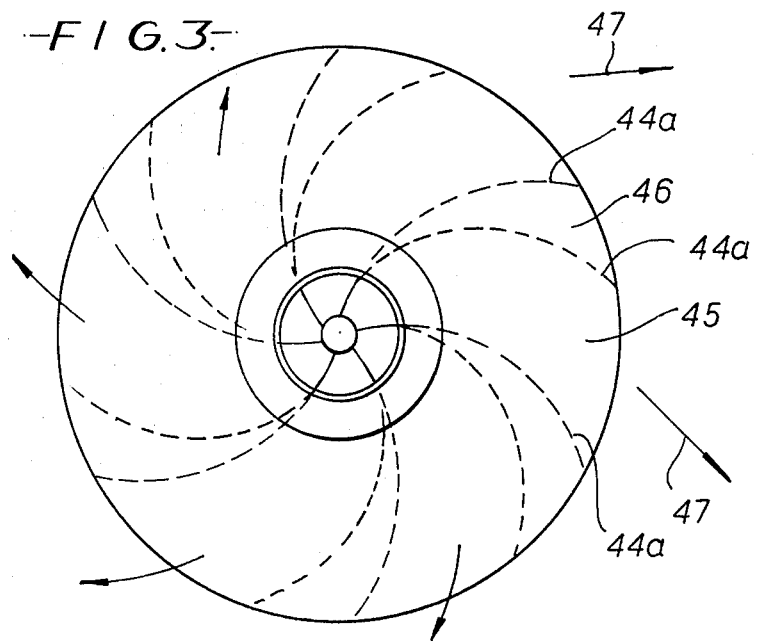

DROP LINE DEVICES

This invention relates to vertical conduit (drop line) devices for delivering fluid cargo to the bottom of a tank, especially in connection with a system for circulation of the cargo from the tank via a pump back to the tank through the vertical conduit.

On storage or transportation of certain cargoes, such as phosphoric acid, in a tank, the cargo can include varying quantities of solid particles which have a tendency to be deposited on the bottom and on other parts which are submerged in the cargo. The greater the quantity of solid particles present in the cargo, the greater are the problems which occur both with regard to general wear and with regard to sedimentation. In order to counteract the sedimentation, it is desirable to maintain the cargo in motion as much as possible in the tank, so that the solid particles do not get much opportunity to separate out into particular layers.

From Norwegian Pat. Specification No. 113,314, a device is known for the circulation of a portion of the fluid cargo in a ship's tank by means of a circulation system with associated pump. The pump is located in a separate pump housing, with a suction conduit from the tank to the pump and with a pressure conduit from the pump over the top of the tank and back to the bottom of the tank through a vertical conduit (drop line). The inlet of the suction conduit and the outlet of the vertical conduit are disposed at opposite ends of the tank so that a transport effect of the cargo is created along the bottom of the ship's tank. By means of such a transport effect, the tendency for the solid particles of the cargo to deposit on the bottom of the tank can be counteracted to a substantial degree.

From Norwegian Pat. Specification No. 121,316, a similar system is known in which the pump is submerged directly in the cargo and in which a heat exchanger is coupled into the circulation system so that the proportion of the cargo which is heated in the circulation system's heat exchanger and which is delivered to the bottom of the tank, receives an upwardly rising movement in the tank in combination with the movement along the bottom of the tank.

With the present invention the aim is to create additional favourable movements of the circulation medium in the tank. A particular objective is to intensify the movement of the circulation medium along the bottom of the tank, and to create further movement in the higher lying layers of the tank. It is a special purpose to achieve such a desired intensified movement without being dependent on moving parts.

According to the present invention a drop line device for the supply of fluid cargo to the bottom of a tank comprises a conduit for arrangement substantially vertically in said tank, said conduit having an upper end for connection to a pressure source of said cargo and a lower end connected to a discharge head for location just above the bottom of said tank, said discharge head being formed with stationary guide surfaces adapted to direct the outflow of cargo over a predetermined angle in a plane along the bottom of said tank.

By the solution according to the invention, there is the possibility of being able to distribute the circulation medium in branch currents from the periphery of the discharge head so that the circulation medium spread itself over a large surface area of the bottom of the tank. These branch currents can, if necessary, set the tank contents in movement obliquely outwards from the vertical conduit (drop line). The result is that the branch currents, together with the portions of the contents of the tank which are dragged along by the branch currents, set the lower layer of the tank contents in motion about the vertical conduit, without the use of moving parts.

An advantageous constructional solution is obtained according to the invention due to the first guide surfaces being formed by an inverted funnel-shaped skirt portion having a convexly curved internal funnel surface and a conically shaped inset portion having essentially correspondingly but concavely curved internal surfaces.

According to the invention, there is obtained a specially advantageous flow in the tank by combining the discharge head with a chamber arranged upstream for the addition of compressed air with the flow to the current through the conduit. In this way, there is the possibility of supplying a special pressure force to the circulation medium just at the outlet of the circulation system in the tank so that an especially intensive influence on the circulation medium can be achieved without substantial flow losses in the circulation system. In addition, there is obtained an extra increase in volume in the circulation medium so that there is a possibility of utilising the outflow cross-section of the discharge head in an especially advantageous manner.

Figure 5:
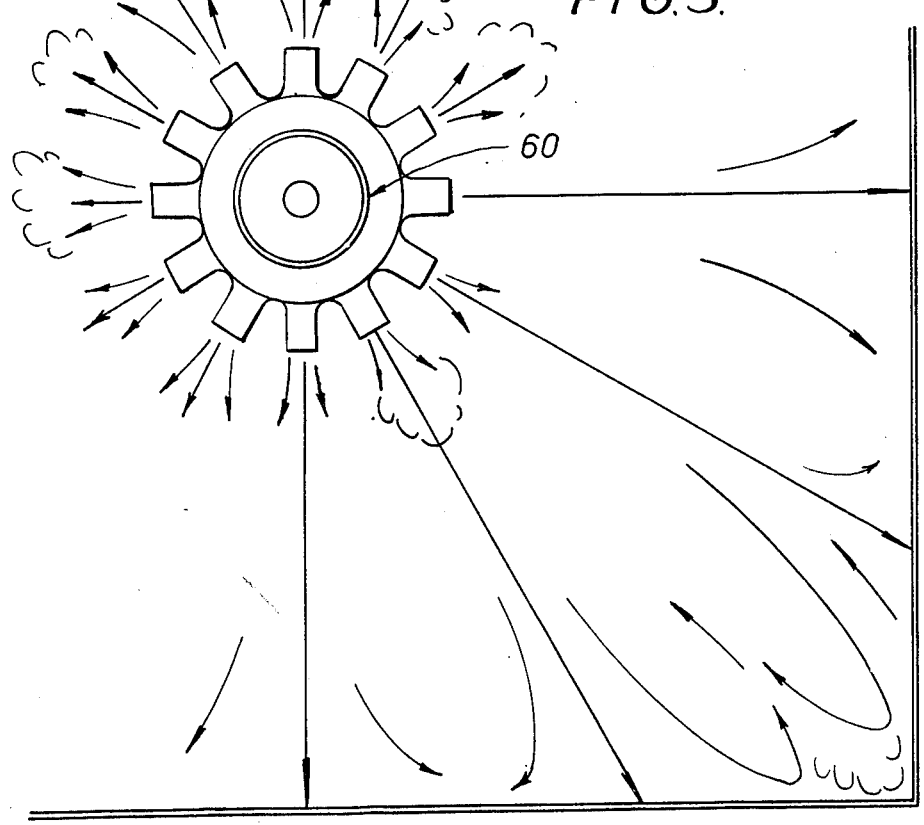

In order that the invention can be more clearly understood, convenient embodiments thereof will now be described, by way of example, with reference to the accompanying drawings in which:

FIG. 1 is a diagrammatic elevation of a circulation system in a ship's tank with the device according to the invention arranged substantially centrally of the tank, FIG. 2 is a vertical section of the device according to a first embodiment of the invention, FIG. 3 is a horizontal section of the device according to FIG. 2, FIG. 4 is a vertical section of the device according to a second embodiment of the invention, and FIG. 5 is a diagrammatic elevation of the device according to FIG. 4.

In FIG. 1, there is illustrated a tank 10, having walls 11, 12, 13, a tank top 14 and a tank bottom 15 which is disposed at a suitable level above the bottom 16 of the ship. At one end of the tank, there is secured to the wall 11 a pump unit 17 via a guide 18. The pump unit comprises a pump housing 19 having a pump impeller arranged between an axial pump inlet 21 and a radial pump outlet 22 to a pressure conduit 23. The shaft of the pump is vertically disposed and the pump is driven by a hydrostatic drive motor located just above the pump housing. The motor and supply and discharge conduits of the drive medium (not shown) are received in a shield jacket 24.

The shield jacket 24 extends parallel to the pressure conduit 23 and is connected to the latter at suitable levels by means of bridge pieces 26, 27, 28 and a top piece 29 at the top of the tank. From the upper side of the top piece, there extends from the pressure conduit 23 a conduit member 23a having a main branch conduit 23b to a tapping point (not shown) and having a side branch conduit 23c which forms a return conduit (drop line) to the bottom of the tank. The branch conduit extends downwardly along tank wall 13 directly opposite tank wall 11. At 30, 31, 32 there are shown valves for closing off the conduit member 23a, the main branch conduit 23b and the side branch conduit 23c relative to each other.

The lower end of the side branch conduit 23c is provided with a discharge head 40 disposed just above the bottom of the tank and in the illustrated embodiment the side branch conduit 23c with associated discharge head 40 is disposed approximately centrally of the tank.

In FIG. 2 and 3, the design of the discharge head 40 is illustrated in detail. The discharge head is composed of an inverted funnel-shaped skirt portion 41 which is provided with an upper horizontal fastening flange 42 for securing the discharge head to the conduit 23c, and a conical inset member 43 together with intermediate vertically arranged separating walls 44 which fix the inset member 43 in rigid connection with the skirt portion 41. The skirt portion 41 has a convexly curved inner surface 41a which reckoned in a vertical plane extends from a vertical course curved downwardly to a horizontal course at the periphery of the discharge head. The inset member 43 has substantially correspondingly concavely curved inner surface 43a which reckoned in a vertical plane extends from a rounded-off conical top curved downwardly to a horizontal course at the periphery of the discharge head. The inner surface 41a and the inner surface 43a constitute first guide surfaces in the discharge head while the separating wall 44 forms second guide surfaces 44a in the discharge head. From FIG. 2, it is evident that the passage between the skirt portion and the inset portion is constricted somewhat in the radial direction. From FIG. 3, it is evident that the separating walls 44 define branch passages 45 between the first pair of separating walls while between the other pair of separating walls there is defined a hollow space 46 which is closed off from the branch passages 45. The sum of the cross-sections of the branch passages is substantially the same in different radial distances from the axis of the conduit 23c and is less than the internal flow cross-section of the conduit 23c. The separating walls extend from a substantially radially outwardly directed course curved in one and the same direction obliquely outwards from the periphery of the discharge head. As shown by arrows 47 in FIG. 3, branch currents are directed outwards from the discharge head in their respective directions, obliquely outwards relative to a radial plane.

Just above the discharge head 40, there is positioned a compressed air nozzle 50 coaxially of the axis of the conduit 23c. The compressed air nozzle 50 is surrounded by a constricted conduit portion 51 so that immediately after the nozzle and the constricted portion, a pressure chamber 52 is formed for mixing together the cargo from the overlying regions of the conduit 23c and the compressed air from the nozzle 50. The compressed air nozzle and the constricted portion produce, besides, an ejector effect against the cargo in the overlying region of the conduit 23c so that an increased suction effect is obtained against the medium above the constricted portion and, at the same time, a pressure influence against the medium in chamber 52. The medium which is emptied from the periphery of the discharge head is given, thereby, an extra pressure force in order to set the cargo in intensive motion just outside the discharge head 40.

In FIG. 4 and 5, there is illustrated an alternative embodiment of discharge head. The discharge head 60 as shown in FIG. 4 and 5 comprises an inverted funnel-shaped skirt portion 61, having a convexly curved internal funnel surface 61a which at the periphery extends in the form of a wave to form inverted U-shaped outflow ducts 61b having intermediate separating walls 61c, together with a conically shaped inset portion 62 having a substantially correspondingly concavely curved internal surface 62a. The inset portion 62 is connected to the skirt portion 61 via downwardly directed edge portions of the outflow ducts 61a. In the illustrated embodiment the ducts 61b extend radially outwards, but can alternatively extend obliquely outwards relative to the radial direction reckoned in a horizontal plane, as indicated in FIG. 4, the flow area of the outlets of the duct 61b are such that the sum of the flow areas of the illustrated 12 nozzles (FIG. 5) is substantially less than the flow area of the conduit 23c. As a result, as indicated in FIG. 5, currents with high flow velocity exit from the outlet openings 61b in order to provide strong and concentrated currents along the bottom of the tank in a relatively long path along the tank bottom. This is illustrated by means of long arrows in FIG. 5.

What we claim is:

1. In combination with a storage tank for fluid cargo, a drop line device for circulating the fluid cargo within said tank, said drop line device comprising
    a pump having an inlet opening into said tank to receive a flow of fluid cargo;
    a conduit connected to said pump and disposed within said tank to receive a pressurized flow of the fluid cargo from said pump; and
    a discharge head connected to said conduit and disposed above a bottom of said tank to discharge the pressurized flow of fluid cargo in a plurality of currents into said tank outwardly of said discharge head to produce strong and concentrated currents of the fluid cargo along the bottom of said tank, said discharge head including a skirt portion having a convexly curved inner surface, an inset member having a concavely curved inner surface opposite said surface of said skirt portion, and a plurality of separating walls extending between said surfaces to define branch passages between each first pair of walls communicating with said conduit and a hollow space between each second pair of walls, wherein the sum of the cross-section of said branch passages is less than the internal flow cross-section of said conduit to provide an increase in flow velocity of the flow at the outlets of said passages.

2. The combination according to claim 1, wherein the discharge head has angularly positioned, nozzle-like outflow ducts at the periphery.

3. The combination as set forth in claim 1 wherein said passages are curved outwardly from said conduit.

4. The combination as set forth in claim 1 wherein said conduit is vertically disposed in said tank.

5. The combination as set forth in claim 1 which further comprises a compressed air nozzle in said conduit for injecting compressed air into the flow of liquid cargo conveyed into said discharge head.

6. In combination with a storage tank for fluid cargo, a drop line device for circulating the fluid cargo within said tank, said drop line device comprising
    a pump having an inlet opening into said tank to receive a flow of fluid cargo;
    a conduit connected to said pump and disposed within said tank to receive a pressurized flow of the fluid cargo from said pump; and
    a discharge head connected to said conduit and disposed above a bottom of said tank, said discharge head including a skirt portion having a convexly curved inner surface, an inset member having a concavely curved inner surface opposite said surface of said skirt portion, and a plurality of outflow ducts to discharge the pressurized flow of fluid cargo in a plurality of currents into said tank outwardly of said discharge head to produce strong and concentrated currents of the fluid cargo along the bottom of said tank, the sum of the cross sections of said outflow ducts is less than the internal flow cross section of said conduit to provide an increase in flow velocity of the flow at said outflow ducts.

* * * * *